(12) United States Patent
Jiang et al.

(10) Patent No.: US 10,847,780 B2
(45) Date of Patent: Nov. 24, 2020

(54) BATTERY ELECTRODE AND METHODS OF MAKING

(71) Applicant: Pacesetter, Inc., Santa Clara, CA (US)

(72) Inventors: Xiaofei Jiang, Clemson, SC (US);
Russell Bruch, Greenville, SC (US);
Joseph Beauvais, Liberty, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 339 days.

(21) Appl. No.: 15/707,870

(22) Filed: Sep. 18, 2017

(65) Prior Publication Data
US 2018/0083260 A1 Mar. 22, 2018

Related U.S. Application Data

(60) Provisional application No. 62/395,935, filed on Sep. 16, 2016.

(51) Int. Cl.
*H01M 4/04* (2006.01)
*H01M 4/08* (2006.01)
(Continued)

(52) U.S. Cl.
CPC .......... *H01M 4/0435* (2013.01); *B29B 7/002* (2013.01); *B29C 43/24* (2013.01); *H01M 4/0471* (2013.01);
(Continued)

(58) Field of Classification Search
CPC .... H01M 4/0435; H01M 4/54; H01M 4/0471; H01M 4/625; H01M 4/623; H01M 4/08;
(Continued)

(56) References Cited

U.S. PATENT DOCUMENTS 3,764,385 A * 10/1973 Whitney ........... H01M 10/0566
429/105
4,111,155 A * 9/1978 Klein ........................ B05C 9/04
118/103
(Continued)

FOREIGN PATENT DOCUMENTS

CN 106252627 * 12/2016
JP 60170920 * 2/1984
(Continued)

OTHER PUBLICATIONS

Leising, Takeuchi "Solid-State Cathode Materials for Lithium Batteries: Effect of Synthesis Temperature on the Physical and Electrochemical Properties of Silver Vanadium Oxide" (Year: 1993).*
(Continued)

*Primary Examiner* — Robert C Dye
*Assistant Examiner* — Guy F Mongelli
(74) *Attorney, Agent, or Firm* — Lerner, David, Littenberg, Krumholz & Mentlik, LLP

(57) ABSTRACT

In some embodiments, a battery, a cathode for a battery, and a method for making a cathode and a battery are provided. The method comprises the steps of at least combining an electrode active material, one or more conductive diluents, a binder and a solvent to form an electrode active mixture having a first solvent to powder weight ratio, reducing a solvent to powder weight ratio to form a paste, feeding the paste into a plastic tube; and calendering the plastic tube. A dry cathode mixture is provided. The dry cathode mixture includes a cathode active material, a conductive diluent and a polymeric binder. A solvent is mixed with the dry mixture to form a slurry. Solvent is removed from the slurry to form a doughy composition. The doughy composition is calender sheeted to form a sheet. The sheet is baked at a temperature of 30° C. to 120° C. for 15 minutes to 6 hours to form a dry sheet. The dry sheet is cut into coupons. The coupons are (Continued)

pressed to form a pressed coupon. The pressed coupons are baked to form cathodes, by subjecting the pressed coupons to a temperature of 30° C. to 120° C. for at least one hour. The cathodes may be processed into batteries.

18 Claims, 7 Drawing Sheets

(51) Int. Cl.
| | |
|---|---|
| H01M 4/48 | (2010.01) |
| H01M 4/62 | (2006.01) |
| B29C 43/24 | (2006.01) |
| B29B 7/00 | (2006.01) |
| H01M 4/54 | (2006.01) |
| B29L 31/34 | (2006.01) |
| B29C 43/52 | (2006.01) |
| H01M 4/02 | (2006.01) |
| B29K 27/18 | (2006.01) |
| B29K 105/16 | (2006.01) |
| B29K 507/04 | (2006.01) |
| B29K 509/00 | (2006.01) |

(52) U.S. Cl.
CPC ............ *H01M 4/08* (2013.01); *H01M 4/48* (2013.01); *H01M 4/54* (2013.01); *H01M 4/623* (2013.01); *H01M 4/625* (2013.01); *B29C 43/52* (2013.01); *B29C 2793/0027* (2013.01); *B29K 2027/18* (2013.01); *B29K 2105/16* (2013.01); *B29K 2507/04* (2013.01); *B29K 2509/00* (2013.01); *B29K 2995/0005* (2013.01); *B29L 2031/3468* (2013.01); *B29L 2031/3475* (2013.01); *H01M 2004/028* (2013.01); *H01M 2220/30* (2013.01)

(58) Field of Classification Search
CPC ............ H01M 4/48; H01M 2004/028; H01M 2220/30; B29C 43/24; B29C 43/52; B29C 2793/0027; B29B 7/002; B29L 2031/3475; B29L 2031/3468; B29K 2995/0005; B29K 2509/00; B29K 2507/04; B29K 2105/16; B29K 2027/18
USPC ........................................................ 264/105
See application file for complete search history.

(56) References Cited

U.S. PATENT DOCUMENTS

| | | | | |
|---|---|---|---|---|
| 4,247,499 A | * | 1/1981 | Glugla | B29C 70/64 264/104 |
| 4,271,242 A | | 6/1981 | Toyoguchi et al. | |
| 4,310,609 A | | 1/1982 | Liang et al. | |
| 4,323,421 A | * | 4/1982 | Klein | B29C 43/18 216/20 |
| 4,391,729 A | | 7/1983 | Liang et al. | |
| 4,440,835 A | * | 4/1984 | Vignaud | H01M 4/8626 429/522 |
| 4,556,618 A | | 12/1985 | Shia | |
| 4,560,633 A | * | 12/1985 | Kobayashi | C08K 7/02 429/213 |
| 4,586,999 A | * | 5/1986 | Goldsmith | C25B 11/035 204/265 |
| 4,830,940 A | * | 5/1989 | Keister | H01M 2/266 429/94 |
| 4,964,877 A | * | 10/1990 | Keister | A61N 1/378 29/623.1 |
| 5,143,805 A | * | 9/1992 | Anderman | H01M 2/14 429/217 |
| 5,180,642 A | | 1/1993 | Weiss et al. | |
| 5,213,713 A | * | 5/1993 | Reitz | B29C 35/12 219/772 |
| 5,221,453 A | | 6/1993 | Crespi | |
| 5,435,874 A | * | 7/1995 | Takeuchi | H01M 4/04 156/242 |
| 5,488,464 A | | 3/1996 | Takeuchi et al. | |
| 5,571,640 A | | 11/1996 | Takeuchi et al. | |
| 5,646,192 A | * | 7/1997 | Dolan | B29B 9/02 521/56 |
| 6,017,656 A | | 1/2000 | Crespi et al. | |
| 6,143,216 A | * | 11/2000 | Loch | H01M 4/13 264/45.1 |
| 6,150,057 A | * | 11/2000 | Takeuchi | H01M 4/58 429/144 |
| 6,153,338 A | | 11/2000 | Gan et al. | |
| 6,174,622 B1 | * | 1/2001 | Thiebolt, III | H01M 4/04 429/217 |
| 6,194,099 B1 | * | 2/2001 | Gernov | H01M 4/36 29/623.5 |
| 6,302,928 B1 | * | 10/2001 | Xu | H01M 4/622 29/623.1 |
| 6,551,747 B1 | | 4/2003 | Gan | |
| 6,566,007 B1 | * | 5/2003 | Takeuchi | C01G 31/00 429/218.1 |
| 6,582,545 B1 | * | 6/2003 | Thiebolt, III | H01M 4/04 156/242 |
| 6,780,355 B2 | * | 8/2004 | Kretman | G02B 5/0247 264/41 |
| 6,783,888 B2 | | 8/2004 | Gan et al. | |
| 6,821,678 B2 | * | 11/2004 | Sumida | C01G 45/02 252/182.1 |
| 7,252,797 B2 | * | 8/2007 | Panzer | H01M 4/0435 264/104 |
| 7,303,594 B2 | * | 12/2007 | Cintra | H01M 4/0402 29/623.1 |
| 7,572,551 B1 | * | 8/2009 | Panzer | H01M 4/0435 264/104 |
| 7,632,434 B2 | * | 12/2009 | Duescher | C09K 3/1436 264/11 |
| 7,820,328 B1 | * | 10/2010 | Takeuchi | C08J 9/26 264/45.1 |
| 8,815,443 B2 | * | 8/2014 | Mitchell | H01G 11/38 429/209 |
| 10,038,193 B1 | * | 7/2018 | Schroder | H01M 10/0525 |
| 2001/0014752 A1 | * | 8/2001 | Igarashi | H01L 51/0094 556/465 |
| 2001/0053484 A1 | * | 12/2001 | Takeuchi | H01M 4/623 429/231.4 |
| 2002/0136948 A1 | * | 9/2002 | Missling | H01M 4/13 429/212 |
| 2002/0167109 A1 | * | 11/2002 | Klug | B29C 43/222 264/175 |
| 2002/0180093 A1 | * | 12/2002 | Reynolds, III | H01M 8/0213 264/115 |
| 2003/0124422 A1 | * | 7/2003 | Cintra | H01M 4/667 429/209 |
| 2003/0194605 A1 | * | 10/2003 | Fauteux | H01M 4/667 429/149 |
| 2004/0013933 A1 | * | 1/2004 | Korshunov | H01M 4/5825 429/221 |
| 2004/0018432 A1 | * | 1/2004 | Adachi | H01M 10/052 429/343 |
| 2004/0086774 A1 | * | 5/2004 | Munoz | H01M 12/06 204/280 |
| 2004/0096742 A1 | * | 5/2004 | Akashi | C08J 9/26 264/45.1 |
| 2004/0145075 A1 | * | 7/2004 | Klug | C04B 35/62218 264/136 |
| 2005/0064290 A1 | * | 3/2005 | Panzer | H01M 4/485 429/218.1 |
| 2005/0112274 A1 | * | 5/2005 | Issaev | H01M 4/72 427/122 |
| 2005/0236732 A1 | * | 10/2005 | Brosch | B29C 48/08 264/210.2 |
| 2006/0073366 A1 | * | 4/2006 | Horiuchi | H01M 8/04022 429/416 |

(56) References Cited

U.S. PATENT DOCUMENTS

| | | | |
|---|---|---|---|
| 2007/0143989 A1* | 6/2007 | Polsonetti | H01M 4/5825 429/221 |
| 2007/0178381 A1 | 8/2007 | Howard et al. | |
| 2008/0057403 A1* | 3/2008 | Issaev | B29C 45/1615 623/8 |
| 2008/0138707 A1* | 6/2008 | Takeuchi | H01M 4/386 429/211 |
| 2009/0117457 A1* | 5/2009 | Davis | H01M 4/13 429/163 |
| 2009/0148756 A1* | 6/2009 | Specht | H01M 4/12 429/94 |
| 2009/0186277 A1* | 7/2009 | Beck | H01M 4/5825 429/221 |
| 2009/0214950 A1* | 8/2009 | Bowden | H01M 4/382 429/207 |
| 2009/0305127 A1* | 12/2009 | Miller | B29C 70/58 429/163 |
| 2010/0014164 A1* | 1/2010 | O'Brien | D04H 1/4374 359/599 |
| 2010/0014215 A1* | 1/2010 | Zhong | H01M 4/0435 361/502 |
| 2010/0112443 A1* | 5/2010 | Blomgren | H01M 4/5825 429/221 |
| 2011/0165463 A1* | 7/2011 | Chang | H01M 4/625 429/223 |
| 2011/0223487 A1* | 9/2011 | Johnson | H01M 4/485 429/319 |
| 2011/0269022 A1* | 11/2011 | Kawakami | H01M 4/5825 429/221 |
| 2011/0318651 A1* | 12/2011 | Leitner | H01M 4/136 429/320 |
| 2012/0148896 A1* | 6/2012 | Dennes | H01M 10/0525 429/144 |
| 2012/0148897 A1* | 6/2012 | Dennes | H01M 2/162 429/144 |
| 2012/0202114 A1* | 8/2012 | Madray | H01M 4/1397 429/211 |
| 2013/0017340 A1* | 1/2013 | Brown | H01M 4/0404 427/458 |
| 2013/0116783 A1* | 5/2013 | Winn | B29C 45/1615 623/8 |
| 2013/0295454 A1* | 11/2013 | Huang | H01M 4/386 429/211 |
| 2013/0337336 A1* | 12/2013 | Yano | H01M 2/145 429/246 |
| 2014/0106228 A1* | 4/2014 | Toya | C01G 53/006 429/223 |
| 2014/0315066 A1* | 10/2014 | Pfleging | H01M 2/18 429/145 |
| 2014/0329142 A1* | 11/2014 | Dickinson | H01M 4/04 429/211 |
| 2015/0004522 A1* | 1/2015 | Lipilin | H01M 8/0254 429/480 |
| 2015/0061176 A1* | 3/2015 | Bruckner | H01M 4/043 264/105 |
| 2015/0280208 A1* | 10/2015 | Kimura | H01M 4/386 429/217 |
| 2016/0013480 A1* | 1/2016 | Sikha | H01M 4/043 427/126.6 |
| 2016/0064711 A1* | 3/2016 | Zhao | H01M 2/145 264/45.9 |
| 2016/0372738 A1* | 12/2016 | Stotz | H01M 4/0404 |
| 2017/0294660 A1* | 10/2017 | Leeratanaphanit | H01M 8/1004 |
| 2017/0306132 A1* | 10/2017 | Takahashi | B32B 9/007 |
| 2017/0334094 A1* | 11/2017 | Pellet | B29C 43/58 |
| 2019/0081317 A1* | 3/2019 | Keil | H01M 4/0435 |
| 2019/0280289 A1* | 9/2019 | Zhang | H01M 4/622 |

FOREIGN PATENT DOCUMENTS

| | | | |
|---|---|---|---|
| JP | 60218822 | * | 4/1984 |
| RU | 2059974 C1 | * | 5/1996 |

OTHER PUBLICATIONS

Takeuchi NPL CHem. Mater. 5, 738-742 (Year: 1993).*

* cited by examiner

BATTERY ELECTRODE AND METHODS OF MAKING

PRIORITY CLAIM

This application claims the benefit of and priority to U.S. Provisional Patent Application Ser. No. 62/395,935, filed Sep. 16, 2016, entitled, "BATTERY ELECTRODE AND METHODS OF MAKING."

TECHNICAL FIELD

The present invention relates generally to methods of making cathodes for a lithium electrochemical cell.

BACKGROUND

Batteries used in implantable medical devices (IMDs), such as cardiac pacemakers and implantable cardioverter defibrillators (ICDs), are required to meet high quality and performance specifications and reliability. They need to have high energy density, high rate capability and long shelf life. Since replacement of the battery of an IMD means that the patient must undergo surgery, batteries for IMDs must have a long service life. Improvement to the reliability, performance, and lifetime of lithium anode batteries is highly desirable.

The fabrication process for a battery electrode, especially the cathode in case of a primary battery is critical to achieve these goals. In the fabrication of components for such batteries, electrodes, including anodes and cathodes, are fabricated, at least in part, from electrode active blanks and plates formed from tapes.

Various processes have been developed to produce battery electrodes, such as press powder, tape casting, extrusion, and calender sheeting, etc. U.S. Pat. No. 4,556,618 to Shia, incorporated herein by reference, describes the preparation of battery cathodes comprising mixing an electrode active material, a conductive carbon additive, such as acetylene black and/or graphite; and polytetrafluoroethylene (PTFE). The process comprises high shear mixing to cause the PTFE to fibrillate. The mixture is then wet with a non-polymeric pore-former to make the mixture more pliable and to create micropores in the electrode when the solution is removed by evaporation. The wet mixture is then sequentially extruded, calendered, or pressed to flatten the mixture to a thin sheet and rolled up and folded and pressed out again. Shia teaches that the higher the level of PTFE in an electrode the higher the voltage losses are for that electrode and that the lower level of binder will provide for more active material in the electrode and give electrodes with higher capacity per unit volume.

U.S. Pat. Nos. 5,435,874 and 5,571,640, both to Takeuchi et al., which are incorporated herein by reference, are directed to a process for manufacturing a free-standing sheet of cathode material. The process involves first adjusting the particle size of the cathode active material followed by mixing with binder and additives suspended in a solvent to form a paste. The paste is fed into a series of roll mills which calender the paste into a sheet form. Alternatively, the paste is first pelletized before being subjected to the calendering step. The resulting cathode sheet material is dried and punched into blanks that are subsequently contacted to a current collector to form an electrode. The pelletized cathode active material, is performed by two to four calender mills which serve to sequentially press the active admixture into a tape of a free-standing sheet.

U.S. Pat. Nos. 6,174,622 and 6,582,545 both to Thiebolt, III, et al., incorporated herein by references, discloses providing blanks or plates of electrode active material wherein a first tape or pellet-shaped structure having a first thickness is subsequently calendered in a secondary rolling step, substantially orthogonal to the direction at which the first calendering step occurred or at a second direction, opposite the first providing a second tape or pellet-shaped structure with a second thickness less than the first thickness of the first tape.

U.S. Pat. No. 7,572,551 to Panzer, et al. describes a method for making an electrode tape, which comprises the steps of blending a composition comprising an electrode active material, a conductive diluent, a binder and a lubricant to form an electrode active mixture, adjusting the solids content of the electrode active mixture to form a filter cake, crumbling the filter cake into particles of the electrode active mixture, and performing at least a primary calendering of the particles of the electrode active mixture at a calendering station by applying a compacting force to forcibly move the particles directly into a nip zone of adjacent calendering rolls to compact the particles of the electrode active mixture in the nip zone.

However, seemingly minor variations in such methods can result in electrodes which fail to meet quality and performance specifications. For example, pelletization can result in the formation of off-specification materials, wherein electrode active sheets and tapes lack required consistency. Lack of homogeneity may alter battery performance, especially the predictability of battery life expectancy. Hence, batteries manufactured using electrodes, especially those prepared from pelletized feedstock often fail to meet manufacturers performance specifications. Moreover, it is difficult to control uniformity of the thickness of the electrode sheet using current extrusion processes, a key factor in electrode performance. In addition, prior extrusion processes resulted in cathode sheets having insufficient strength to reliably form thin electrodes suitable for high rate battery applications and resulted in an unacceptable amount of waste.

ICDs treat ventricular fibrillation, also known as sudden cardiac death. Ventricular fibrillation is characterized by rapid, erratic contraction of the heart resulting in little or no pumping of blood and is generally a fatal condition. An ICD delivers a high-energy pulse (typically up to 35 J) to the heart within seconds of detecting ventricular fibrillation. Minimizing the time a patient remains in fibrillation is an important goal of this therapy. To deliver this life-saving therapy, the ICD battery charges a capacitor to the desired energy level in as short a time as possible, and the capacitor is subsequently discharged through the heart. Because prompt therapy is desirable, the capacitor charge-time, typically in the range of 5 to 15 seconds, is a key measure of device performance.

Prior extrusion processes also resulted in over-compacting and excessive stretching of the binder, resulting in batteries having charging times increase due to inadequacies in the electrolyte's ability to flow through the cathode.

Accordingly, there is a need for improved and more efficient processes for manufacturing electrode material having a higher mechanical strength for subsequent calender sheeting procedures, reduces cell acceptance test variation, and that results in active materials that are more homogenous and have a more consistent thickness and results in a battery that provides more usable capacity and faster charge times.

SUMMARY

In some embodiments, a battery, a cathode for a battery, and a method for making a cathode and a battery are provided. A method and battery made by the method are provided for making an electrode, the method comprising the steps of at least combining an electrode active material, one or more conductive diluents, a binder and a solvent to form an electrode active mixture having a first solvent to powder weight ratio, reducing a solvent to powder weight ratio to form a paste, feeding the paste into a plastic tube; and calendering the plastic tube.

A method and battery made by the method are provided, the method comprising providing a dry cathode mixture, comprising: a cathode active material; a conductive diluent; a polymeric binder; mixing a solvent with the dry mixture to form a slurry, removing solvent from the slurry to form a doughy composition; calender sheeting the doughy composition to form a sheet; bake the sheet at a temperature of 30° C. to 120° C. for 15 minutes to 6 hours to form a dry sheet; cutting the dry sheet into coupons; pressing the coupons to form a pressed coupon; bake the pressed coupon to form a cathode, by subjecting the pressed coupon to a temperature of 30° C. to 120° C. for at least one hour.

BRIEF DESCRIPTION OF THE DRAWINGS/FIGURES

DETAILED DESCRIPTION OF THE INVENTION

Figure 1A:
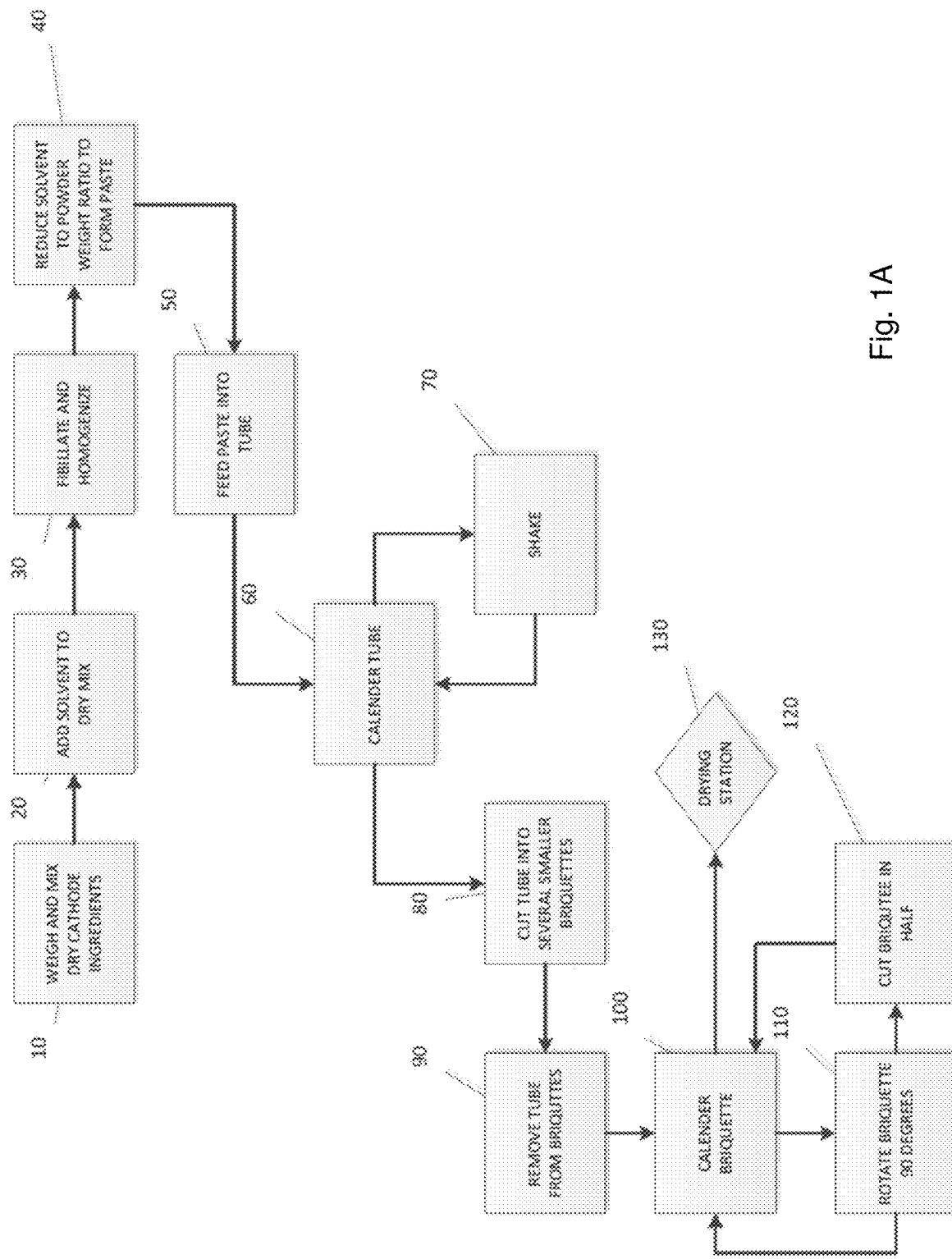
FIG. 1A is a flowchart of a process for making a cathode sheet, in accordance with certain embodiments.

Calender Sheeting Process for High Performance Battery Electrode Fabrication

A novel calender sheeting process is disclosed herein which involves taking an already prepared cathode active starting material comprising a metal oxide or a mixed metal oxide, such as silver vanadium oxide, and manufacturing free-standing cathode for use in an electrochemical cell. The cathode starting material can be made by the chemical addition, decomposition, or otherwise intimate contact of various metal oxides, mixed metal oxides and/or metal elements during thermal treatment, sol-gel formation, chemical vapor deposition or hydrothermal syntheses in mixed states, as is well known to those of ordinary skill in the art. Examples of cathode materials that may be formed into a cathode sheet according to the present invention include silver vanadium oxide (SVO), copper vanadium oxide, manganese dioxide, copper silver vanadium oxide (CSVO), carbon, fluorinated carbon, metal oxide and carbon monofluoride (CFx), metal oxide and carbon monofluoride, mixed SVO and CFx, cobalt oxide and nickel oxide, titanium disulfide, and other cathode materials typically used in lithium anode electrochemical cells. For example, the calendering process is applicable to pure SVO cathodes, hybrid SVO/CFx cathodes (e.g., 15% SVO and 85% CFx mixes, or SVO/separator/CFx sandwiches), and pure CFx cathodes, batteries. The calendering process is applicable to high rate, medium rate, and low rate batteries. The calendering process is useful for constructing electrodes for both primary and secondary electrochemical cells.

U.S. Pat. Nos. 4,310,609 and 4,391,729, both to Liang et al., incorporated herein by reference, disclose the preparation of silver vanadium oxide (SVO) by a thermal decomposition reaction involving a final heat treatment step of about 360° C. U.S. Pat. No. 5,498,494 to Takeuchi et al., incorporated herein by reference, describes the preparation of SVO from $Ag_2O$ and $V_2O_5$ by a chemical addition reaction. U.S. Pat. No. 5,221,453 to Crespi, incorporated herein by reference, discloses the preparation of silver vanadium oxide from $AgVO_3$ and $V_2O_5$ or $Ag_2O$ and $V_2O_5$ by a chemical addition reaction in a temperature range of about 300° C. to about 700° C.

U.S. Pat. No. 6,017,656 to Crespi, U.S. Pat. No. 5,180,642 to Weiss, U.S. Pat. No. 6,783,888 to Gan et al., and U.S. Patent Application Publication No. 2007/0178381 to Howard et al., each of which is incorporated herein by reference, disclose the preparation of hybrid cathode containing a mixture of silver vanadium oxide (SVO) and carbon monofluoride (CFx).

U.S. Pat. Nos. 6,551,747 and 6,783,888, both to Gan, incorporated herein by reference, describes a sandwiched cathode design for use in a high rate electrochemical cell. The sandwich cathode is composed of a first cathode active material of a relatively high energy density but of a relatively low rate capability, such as CFx, $Ag_2O$, and SVO, sandwiched between two layers of current collector.

U.S. Pat. No. 4,271,242 to Toyoguchi, et al. incorporated herein by reference, discloses the use of fluorinated carbons obtained by fluorinating carbon having a lattice constant of 3.40-3.50 A in its (002) plane to prepare a Li/CFx battery. The carbon is selected from among petroleum cokes and coal cokes and the resulting battery has excellent discharge and shelf life characteristics. The fluorinated carbon materials described in this patent are generally accepted as the industry standard for lithium batteries employing fluorinated carbon cathodes and such materials are widely used in commercial battery production. Fluorinated petroleum coke is the most commonly used form of fluorinated carbon for Li/CFx cells and this material is described in numerous patents relating to battery construction and operation in the field of implantable medical use. Carbon monofluoride, often referred to as carbon fluoride, polycarbon monofluoride, CFx or graphite fluoride is a solid, structural, non-stoichiometric fluorocarbon of empirical formula CFx, wherein x is 0.01 to 1.9, preferably 0.1 to 1.5, and more preferably 1.1. One commercial form of carbon monofluoride is $(CFx)n$ where $0<x<1.25$ (and n is the number of monomer units in the polymer, which can vary widely).

Generally, production of CFx involves an exemplary chemical reaction such as:

$$F_2+(x+y+z)C \rightarrow xCF_{1.1}+yC+z(CF_{n=2})$$

where x, y, and z are numerical values that may be positive integers or positive rational numbers. In this reaction, fluorine and carbon react to form $CF_{1.1}$. Unreacted carbon and impurities are by-products of the chemical reaction, which are preferably minimized during production of CFx. It is desirable to achieve a weight percentage of fluorine greater than or equal to 61% in CFx while reducing impurities. Preferably, greater than or equal to 63% or 65% of fluorine exists in the CFx. Purity, crystallinity, and particle shape, particularly of the carbon precursor, are also properties to consider in the selection of carbon monofluoride. This is described in greater detail in U.S. Patent Application Publication No. 2007/0178381 (Howard et al.), incorporated herein by reference.

Figure 1B:
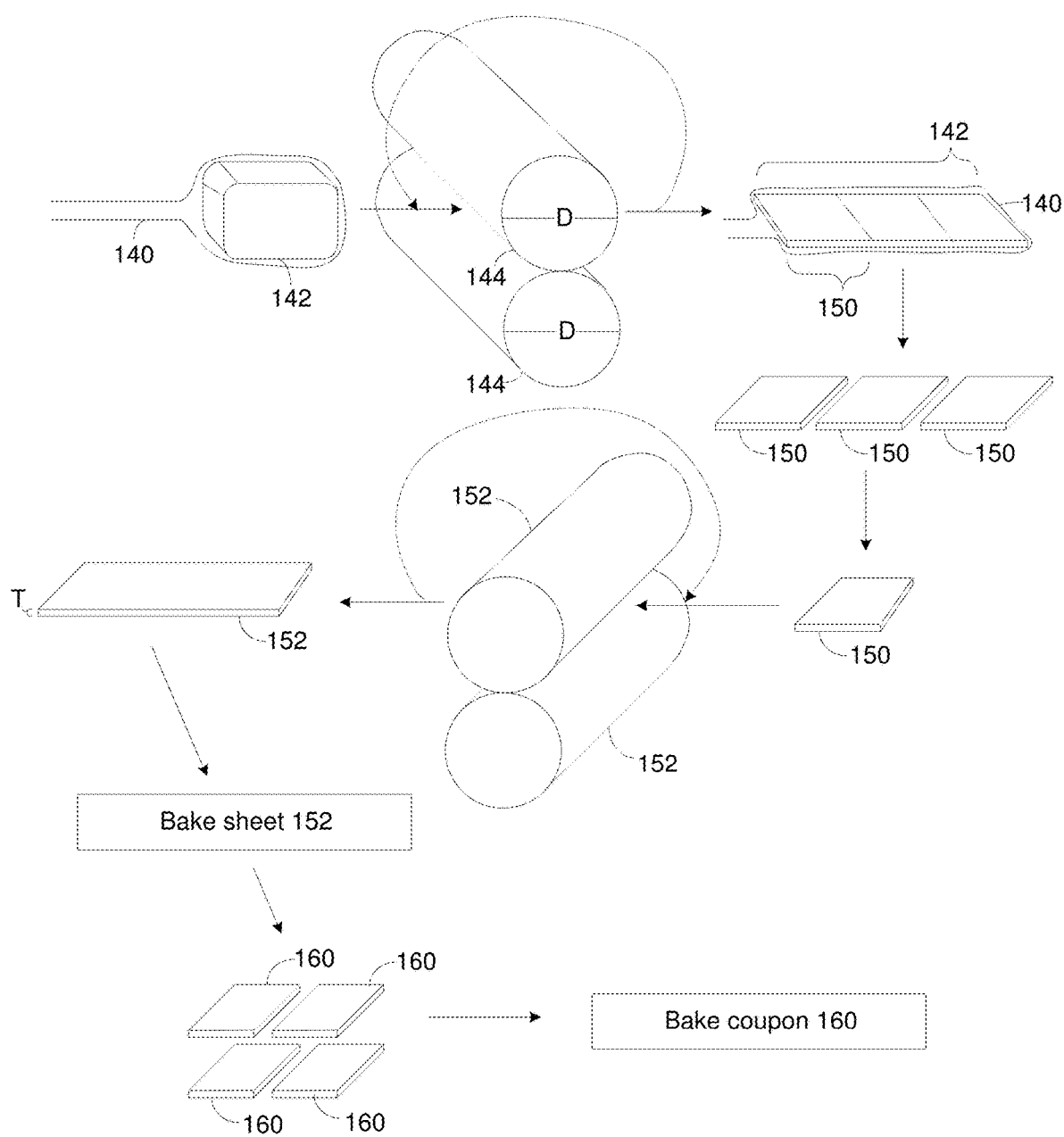
FIG. 1B is a schematic illustrating portions of the process shown in FIG. 1A.

FIG. 1A is a block diagram illustrating a process of the present disclosure and FIG. 1B is a schematic illustrating portions of the process shown in FIG. 1A. The process starts by weighing and mixing electrode active material with one or more conductive diluents and a binder at step 10. In certain embodiments, the electrode active material is silver vanadium oxide (SVO), the conductive diluents are graphite and carbon black, and the binder is polytetrafluoroethylene (PTFE) powder. Other electrode active materials, conductive diluents, and binders may be used as fall within the scope of this disclosure. At step 20, a solvent is added to the dry mix. In certain embodiments, the solvent is a liquid paraffin, such as Isopar® G available from Exxon Mobile. Liquid paraffin wets well with the electrode components and it is also inert. In certain embodiments, an excess of liquid to solid is used, such that the liquid paraffin may be used as a solvent for the powder mixing process and a lubricant for the subsequent sheeting process. In certain embodiments, where the electrode active material is SVO, a 1.2 liquid to 1.0 solid weight ratio may be used. In certain embodiments, e.g., where the electrode active material is CFx or wherein the electrode active material is approximately 15% SVO and approximately 85% CFx (20-10% SVO and 80-90% CFx), a much larger amount of liquid paraffin may be used, for example 300 g liquid per 100 g solid (a 3.0 liquid to 1.0 solid weight ratio) may be used. Excess solvent may also be added at subsequent steps to improve material handling. The solution is then mixed at step 30 using a high speed high shear mixer such as a homogenizer, to disperse the binder PTFE and achieve homogeneous powder mixing.

The solvent to powder weight ratio is then reduced at step 40 by weight using vacuum filtration, press filtration, heat evaporation, or centrifuge filtration processes to remove sufficient solvent to convert the electrode active paste to the consistency of a filter cake. In embodiments where SVO is used as the active electrode, the solvent to powder weight ratio may be reduced to approximately 22%. Other powder weight ratios may be used, so long as the electrode active paste is converted to a consistency of a filter cake. For example, the solvent to powder weight ratio may be reduced at step 40 to between approximately 25% to 15% by weight.

A kneading process is used to fibrillate the PTFE binder and achieve mechanical strength of the cathode material for subsequent calender sheeting procedures. The kneading process of the current disclosure advantageously provides a cathode having a more uniform thickness than previously used extrusion systems. Also, advantageously, the kneading process provides for a less compact cathode sheet, which permits electrolyte to flow well within the battery, decreasing the charging time at which the battery charges a cathode of the ICD in order to provide life-saving defibrillation to patients. Also advantageously, the kneading process of the present disclosure can be used to produce cathodes having a large range of thicknesses (from very thin electrodes suitable for high rate applications requiring large surface areas, medium thickness electrodes suitable for medium rate applications, to thick electrodes suitable for low rate applications). In addition, the kneading process produces less waste than previously used extrusion systems.

The kneading process begins by first feeding the cake 140 into a soft plastic tube or poly bag 142 at step 50. In certain embodiments, the poly bag is shaken or otherwise agitated until the material is in the bottom one third of the bag. The bag may then be laid flat at a works station and the cake may be flattened into a bottom portion of the poly bag, e.g., using the palm of one's hand and/or using a scoopula. The bag may then be run through a calender machine at step 60 by inserting the closed end of the bag between rollers 144 of the machine. In certain embodiments, the diameter (labeled D in FIG. 1B) of the rollers used at step 60 is 4 inches or smaller in order to provide a cathode sheet that is less compact. In certain embodiments, the rollers are 1 inch to 3 inches in diameter. Without being limited to any theory as to how some embodiments work, it is believed that providing for a less compact cathode sheet will enable the battery's electrolyte to flow well through the resulting cathode, thereby decreasing the amount of time the battery takes to charge a capacitor.

Various nip gap settings may be used at step 50 for the calender rollers depending on the desired thickness of the end product. For example, in certain embodiments, wherein the desired end product includes an SVO cathode blank having a thickness of 0.015 inches, a nip gap of 0.08 inches may be used at step 60 in order to produce a cake having a thickness of 0.08 inches after step 60. This is just an example and other nip gaps may be used if less or more calendaring steps 100 (described below) and/or cutting/folding steps 120 (described below) are used, as will be appreciated by a person of skill in the art after reading this disclosure.

After the bag or tube exits the calendering machine, the bag/tube may then be opened and the cake again moved to the bottom portion of the bag, e.g., by shaking or otherwise agitating the tube until the cake is within the bottom third of the bag at step 70. The tube can then be run through the calender again (repeating step 60), using the same or a smaller nip gap setting each time, if more fibrillation is needed, and shaking step 70 may also be repeated. Typically, the calendering step 60 is performed by two to four calenderings and shaking step 70 is correspondingly performed two to three times.

Once sufficient integrity of the cathode mix is achieved, the plastic bag is cut at regular intervals depending on the material and desired end product dimensions (e.g., three inch intervals) from the bottom of the bag to cut the cathode material into smaller briquettes 150 of a suitable size at step 80. The plastic tube is then removed from the briquettes at step 90.

The briquettes are then calendered at step 100. In some embodiments, the nip gap at briquette calendaring step 100 is set at the same setting as the prior calendering tube step 60. For example, for an end product including an SVO cathode blank having thickness of approximately 0.015 inches, a gap setting of 0.08 inches may be used in order to obtain a briquette having a thickness of 0.08 inches at the initial briquette calendaring step 100. As each section of the roll comes out in the machine direction (MD) of the roller 152, the briquette may be rotated 90 degrees at step 110. The briquette may then be cut in half and each half pressed together or stacked at step 120. Alternatively, the briquette is folded in half. Cutting the briquettes is advantageous over folding the briquettes for easier process handling. Cutting or folding the briquettes advantageously permits more even fibrillation in both the transverse direction (TD) and MD.

Step 100 may then be repeated, either in the MD or in the TD, and either using the same or a smaller nip gap setting. In certain embodiments, the same elongation ratio is kept in both the machine direction (MD) and the transverse direction (TD) during sheeting steps. In certain embodiments, the nip gaps are set such that the sheet thickness reduction ratio is kept no greater than 50% per calender step. For example, after using a nip gap setting of 0.08 inches at the initial briquette calendaring step 100, the same nip gap setting may be repeated or a nip gap setting of 0.04 or more may be used for the next briquette calendaring step 100. There may be multiple calender steps, wherein the calender nip gap is reduced gradually during each step. As stated earlier, a small calender roll diameter of about 1.5 inches may be used to promote stretching, rather than compacting during the sheeting process. The sheet 154 goes through different nip gaps at step 100, is rotated at step 110 and/or cut or folded at step 120 for several iterations until the cathode sheet reaches the desired thickness, strength, and uniformity. It is then transferred to the drying station at step 130 for further processing.

As a person of skill in the art will appreciate after reading the present disclosure, various nip gap settings may be used, depending on the desired thickness of the end product cathode sheet. While all sheets may use the same nip gap for tube calendering step 60 and begin briquette calendering step 100 using approximately the same nip gap, more or less iterations of briquette calendering step 100 may be used depending on the target cathode thickness. In addition and/or alternatively, more folding/cutting steps 100 and/or rotation steps 110 between calendering step 100 may be used for thicker cathodes than for thinner cathodes, which would also permit sufficient and more even fibrillation in both the TD and MD of the thicker briquette.

The cathode may further incorporated into a primary or secondary electrochemical cell, as is well known to those of ordinary skill in the art. In that respect, a cathode component prepared by the method of the present invention can be used, for example, in a nonaqueous electrochemical cell as described in U.S. Pat. No. 4,830,940 to Keister et al., incorporated herein by reference. The electrochemical cell contains an anode of a metal selected from Group IA of the Periodic Table of Elements, including lithium, sodium, potassium, etc., preferably lithium, and their alloys and intermetallic compounds, for example Li—Si, Li-Ai, Li—B and Li—Si—B alloys and intermetallic compounds. The form of the anode may vary, but typically the anode is in the form of a thin sheet or foil of the anode metal, and a current collector having an extended tab or lead affixed to the anode sheet or foil.

In order to prevent internal short circuit conditions, the cathode is separated from the Group IA, IIA or IIIB anode material by a suitable separator material. The separator is of electrically insulate material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidene fluoride, polyethylenetetrafluoroethylene, and polyethylenechlorotrifluoro-ethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

A suitable electrolyte for a primary electrochemical cell has an inorganic, ionically conductive salt dissolved in a nonaqueous solvent. More preferably, the electrolyte includes an ionizable alkali metal salt dissolved in a mixture of aprotic organic solvents comprising a low viscosity solvent and a high permittivity solvent. In the case of an anode comprising lithium, the alkali metal salt is lithium based. Known lithium salts useful as vehicles for transport of lithium ions from the anode to the cathode include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiNO_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), diethyl carbonate, ethyl methyl carbonate, and mixtures thereof. High permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

In secondary electrochemical systems, the anode or negative electrode comprises a material capable of intercalating and de-intercalating the alkali metal, and preferably lithium. A carbonaceous anode comprising any of the various forms of carbon (e.g., coke, graphite, acetylene black, carbon black, glassy carbon, pitch carbon, synthetic carbon, mesocarbon microbeads, and mixtures thereof), which are capable of reversibly retaining the lithium species, is preferred. Graphite is particularly preferred due to its relatively high lithium-retention capacity.

A typical secondary cell negative electrode is fabricated by mixing about 90 to 97 weight percent graphite with about 3 to 10 weight percent of a binder material. The binder is preferably a fluoro-resin powder such as polytetrafluoroethylene (PTFE), polyvinylidene fluoride (PVDF), polyethylenetetrafluoroethylene (ETFE), a polyamide or a polyimide, and mixtures thereof. This anode active admixture is contacted to a metallic current collector usually made from a thin foil of copper, nickel, and nickel-plated steel, stainless steel or titanium.

The positive electrode comprises at least one of the above-described cathode active materials mixed with a suitable conductive diluent including acetylene black, carbon black and/or graphite. Metal powders of nickel, aluminum, titanium and stainless steel are also useful conductive diluents. The positive electrode further comprises a fluoro-resin binder, preferably in a powder form, such as PTFE, PVDF, ETFE, a polyamide or a polyimide, and mixtures thereof. The cathode active admixture is contacted to a metallic current collector usually made from a thin foil of copper, nickel, and nickel-plated steel, stainless steel or titanium.

The preferred electrolyte for the secondary cell includes an alkali metal salt dissolved in a quaternary, nonaqueous carbonate solvent mixture consisting of about 10% to about 50% ethylene carbonate, about 5% to about 75% dimethyl carbonate, about 5% to about 50% ethyl methyl carbonate and about 3% to about 45% diethyl carbonate, by volume. For a more thorough discussion of such an electrolyte, reference is made to U.S. Pat. No. 6,153,338 to Gan et al., which is assigned to the assignee of the present invention and incorporated hereby by reference.

The preferred form of the primary and the secondary electrochemical cell is a case-negative design wherein the anode/cathode couple is inserted into a conductive metal casing connected to the anode current collector, as is well known to those skilled in the art. A preferred casing material is titanium although stainless steel, mild steel, nickel, nickel-plated mild steel and aluminum are also suitable. The casing header comprises a metallic lid having an opening for the glass-to-metal seal/terminal pin feedthrough for the cathode electrode and an electrolyte fill opening. The cell is thereafter filled with the appropriate electrolyte solution and hermetically sealed such as by close-welding a stainless steel plug over the fill opening, but not limited thereto. The cell of the present invention can also be constructed in a case-positive design.

Calendering Example

Objects and advantages of this disclosure are further illustrated by the following examples. The particular materials and amounts thereof recited in these examples, as well as other conditions and details, should not be construed to unduly limit this disclosure.

Silver vanadium oxide (SVO), graphite, carbon black, and polytetrafluoroethylene (PTFE) powder were weighed out and placed in a beaker. The proportions were as follows: 94% SVO, 1% graphite, 2% carbon black, and 3% PTFE by-weight. Weights were 188 g SVO, 2 g graphite, 4 g carbon black, and 6 g PTFE, ±0.005 g. 240 g±0.005 g Isopar® G was added to the dry ingredients, to arrive at approximately a 1.2 liquid to 1.0 solid weight ratio. The dry ingredients were combined with the Isopar® G using a plastic stirrer by slowly stirring. The ingredients were then mixed using a Dynamic MX070 MiniPro Mixer, slowly increasing the speed and run five minutes±30 seconds at maximum speed to form a thick paste.

The paste was then placed on to 9.0 cm Fisher Scientific® P2 Grade filter paper in a Büchner funnel. A vacuum was applied to the funnel and the paste was vacuumed until slight cracks formed on the surface to form a cake.

Approximately one half of the cake was then placed in a 2⅝ inch×15 inch poly bag. The remaining portion of the cake was placed in another poly bag. The poly bag was held up gently and shaken until the material was in the bottom one third of the bag. The bag was then laid flat on a work surface and the cake material was manually flattened into the bottom five inches of the poly bag. A scoopula was used to ensure that there were no voids or air pockets between the material and the bag.

The closed end of the bag was then gently inserted between the rollers having a diameter of 1.5 inches of an Imperia RM220 electric pasta machine, available from Emiolmiti®, using setting #6 (having a nip gap of 0.08 inch) and calendered (tube calendering step). The diameter of the rollers The bag was then opened up and the bag was shaken to knock the material down to the bottom third of the bag (shaking step). The tube calendering step (using the same machine setting) and shaking step were repeated two additional times. The bag was then marked off at three inch intervals from the bottom of the bag up and cut at the demarcations. The bag was cut off and removed from the material.

Each section of material ("sample") was run through the calender rolls of the Imperia RM220 electric pasta machine at setting #3 (using a 0.04 inch calender nip) in the transverse direction (TD), resulting in the samples having a thickness of about 0.04 inch. As each section of the roll came out in the machine direction (MD), the samples were rotated 90° for the next step. The samples were then run through calender rollers using setting #2 of the machine (having a nip gap of 0.02 inch) in the TD to obtain briquettes having a thickness of about 0.02 inch. The samples were then folded in half for the next step to obtain briquettes having a thickness of about 0.04 inch. The samples were then run through the machine in the MD using setting #2 (having a nip gap of 0.02 inch), to obtain briquettes having a thickness of about 0.02 inch. The samples were then rotated 90° and run through the machine in the TD using a #1.3 setting (having a nip gap of 0.015 inch), resulting in briquettes having a thickness of about 0.015 inch. The sheet blanks were then placed on aluminum foil and taken to the bake station for further processing.

Calender Sheeting Parameters

Figure 2A:
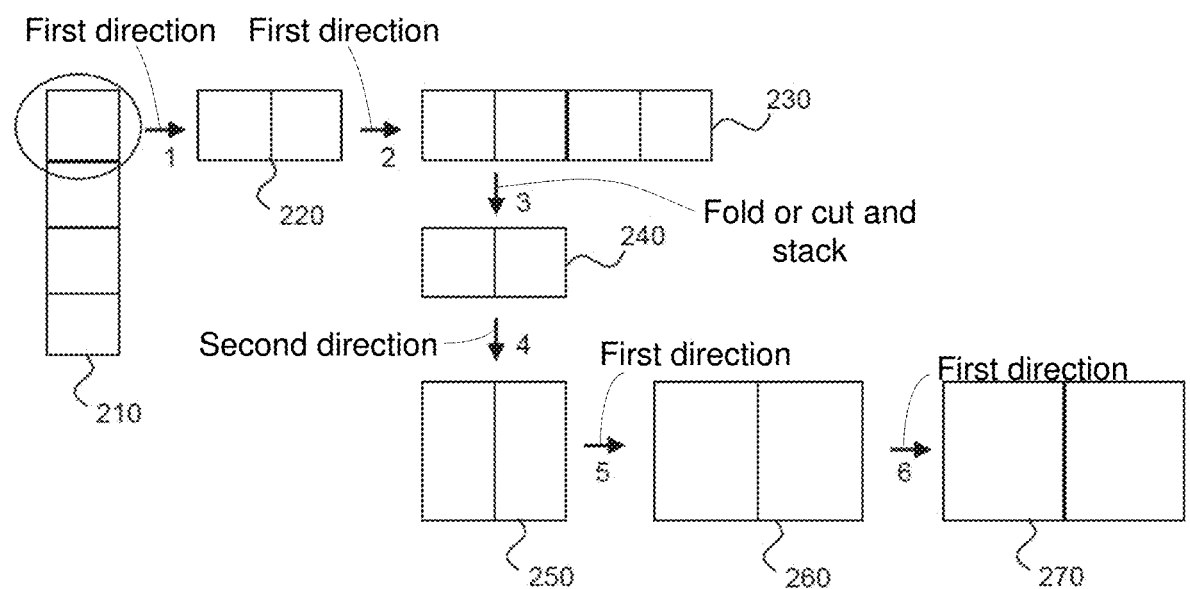
FIG. 2A shows a cathode sheet after various calender sheeting steps, in accordance with certain embodiments.

FIG. 2A illustrates a cathode sheet after various calender sheeting steps following tube calendering step 60 (FIG. 1) in accordance with an embodiment of the disclosure, using the following parameters:

| Process Step | Initial width (in) | Initial length (in) | Initial thickness (in) | Final width (in) | Final length (in) | Final thickness (in) | Direction |
|---|---|---|---|---|---|---|---|
| 1 | 2.9 | 2.6 | .08 | 2.9 | 5.3 | .04 | TD |
| 2 | 2.9 | 5.3 | .04 | 2.9 | 10.5 | .02 | TD |
| 3 | 2.9 | 10.5 | .02 | 2.9 | 5.3 | .04 | Fold or Cut and Stack |
| 4 | 5.3 | 2.9 | .04 | 5.3 | 5.8 | .02 | MD |
| 5 | 5.8 | 5.3 | .02 | 5.8 | 7 | .015 | TD |
| 6 | 5.8 | 7 | .015 | 5.8 | 8.8 | ~/.012* | TD |

Other parameters may be used depending on the desired dimensions of the electrode end product in accordance with the current disclosure. In accordance with this embodiment, sheet 210 is the initial sheet, still in the poly bag, which has been segregated into four equal rectangles having a width of 2.9 inches, a length of 2.6 inches, and a thickness of 0.08 inches each. Sheet 210 is cut into four samples having a width of 2.9 inches, a length of 2.6 inches, and a thickness of 0.08 inches each. A first sample, circled in FIG. 2A, is calendered in the traverse direction (TD) using a nip gap configured to reduces the thickness of the sheet by 50% in process step 1 to form sheet 220. Sheet 220 has a final width of 2.9 inches, final length of 5.3 inches, and a final thickness of 0.04 inches. In process step 2, sheet 220 is calendered in the TD using a nip gap configured to reduce the thickness of the sheet by 50% to form sheet 230. Sheet 230 has a final width of 2.9 inches, final length of 10.5 inches, and a final thickness of 0.02 inches. In process step 3, sheet 230 is folded or cut in half to form sheet 240. Sheet 240 has a final width of 2.9 inches, final length of 5.3 inches, and a final thickness of 0.04 inches. In process step 4, sheet 240 is rotated 90 degrees and calendered in the machine direction (MD) using a nip gap configured to reduces the thickness of the sheet by 50% to form sheet 250. Sheet 250 has a final width of 5.3 inches, final length of 5.8 inches, and a final thickness of 0.02 inches. In process step 5, sheet 250 is rotated 90 degrees and calendered in the traverse direction (TD) using a nip gap configured to reduces the thickness of the sheet by 25% to form sheet 260. Sheet 260 has a final width of 5.8 inches, final length of 7 inches, and a final thickness of 0.015 inches. In process step 6, sheet 260 is calendered in the traverse direction (TD) using a nip configured to reduces the thickness of the sheet by approximately 20% to form sheet 270. Sheet 270 has a final width of 5.8 inches, final length of 8.8 inches, and a final thickness of approximately 0.012 inches.

Figure 2B:
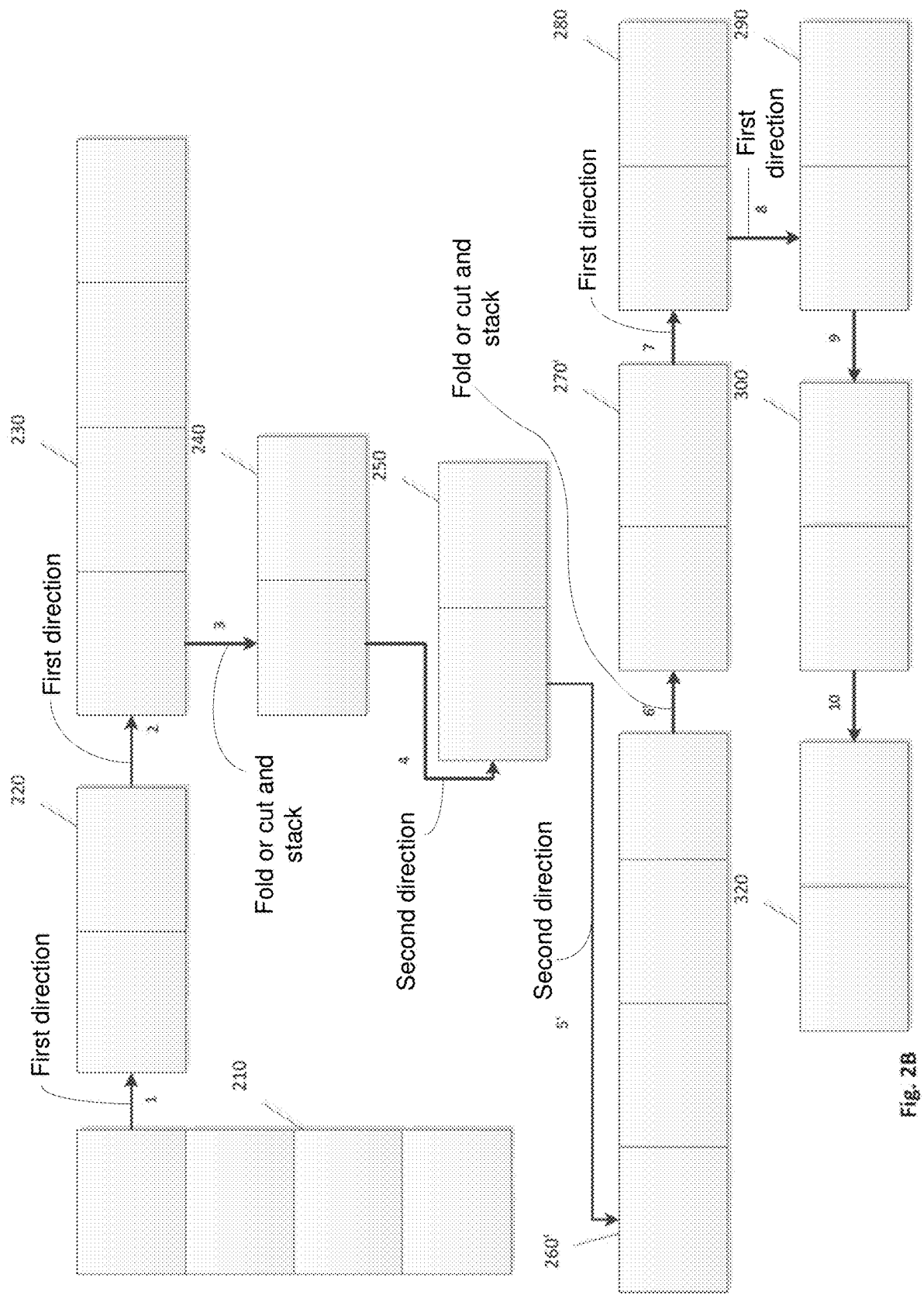
FIG. 2B shows a cathode sheet after various calender sheeting steps, an alternative embodiment.

While specific parameters are disclosed for calender sheeting steps and folding steps, more or less steps may be used. FIG. 2B illustrates an alternative embodiment of processing a cathode sheet after various calender sheeting steps following step 60 (FIG. 1) using the following parameters:

| Process Step | Initial width (in) | Initial length (in) | Initial thickness (in) | Final width (in) | Final length (in) | Final thickness (in) | Direction |
|---|---|---|---|---|---|---|---|
| 1 | 2.9 | 2.6 | .08 | 2.9 | 5.3 | .04 | TD |
| 2 | 2.9 | 5.3 | .04 | 2.9 | 10.5 | .02 | TD |
| 3 | 2.9 | 10.5 | .02 | 2.9 | 5.3 | .04 | Fold or Cut and Stack |
| 4 | 5.3 | 2.9 | .04 | 5.3 | 5.8 | .02 | MD |
| 5' | 5.3 | 5.8 | .02 | 5.3 | 11.6 | .01 | MD |
| 6' | 5.3 | 11.6 | .01 | 5.3 | 5.8 | .02 | Fold or Cut and Stack |
| 7' | 5.8 | 5.3 | .02 | 5.8 | 7 | .015 | TD |
| 8' | 5.8 | 7 | .015 | 5.8 | 8.8 | ~/.012* | TD |

The embodiment illustrated in FIG. 2B is the same as FIG. 2A until process step 5'. In process step 5' sheet 250 is calendered in the MD using a nip gap configured to reduces the thickness of the sheet by 50% to form sheet 260'. Sheet 260' has a final width of 5.4 inches, final length of 11.6 inches, and a final thickness of 0.01 inch. In process step 6', sheet 260' is folded or cut in half and stacked to form sheet 270'. Sheet 270' has a final width of 5.3 inches, final length of 5.8 inches, and a final thickness of 0.02 inch. In process step 7', sheet 270' is rotated 90 degrees and calendered in the traverse direction (TD) using a nip configured to reduces the thickness of the sheet by 25% to form sheet 280. Sheet 280 has a final width of 5.8 inches, final length of 7 inches, and a final thickness of 0.015 inches. In process step 8', sheet 280 is calendered in the traverse direction (TD) using a nip gap configured to reduces the thickness of the sheet by approximately 20% to form sheet 290. Sheet 290 has a final width of 5.8 inches, final length of 8.8 inches, and a final thickness of approximately 0.012 inch.

The initial and final dimensions may vary significantly from what is specifically disclosed depending on the desired end product cathode dimensions. The kneading and calendering process disclosed advantageously achieves a cathode having greater mechanical strength and a more uniform thickness, thereby improving the quality of the electrode. The kneading and calendering process is applicable to high rate, medium rate, and low rate batteries. The process may be used to make a thin cathode having a high surface area suitable for high rate batteries. The process also advantageously results faster life-saving therapy for patients who have ICDs that include the resulting battery. Further, given the consistent quality of the cathodes achieved, the process results in less waste during manufacture of the batteries.

Baking Cathodes Before and after Cutting and Pressing

Figure 3:
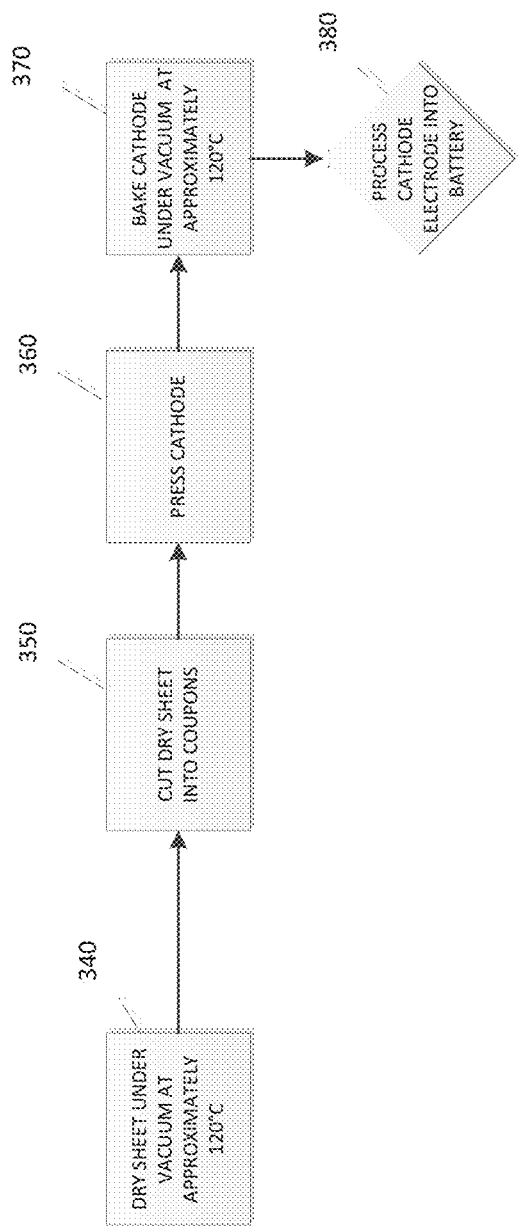
FIG. 3 shows a flowchart of a process for thermally setting a battery cathode with a PTFE binder, in accordance with certain embodiments.

Turning to FIG. 3, after calendering (e.g., FIGS. 1 and 2A and 2B), the cathode sheet may then be dried to remove solvent and/or water from the active material at approximately 120° C. at step 340. In certain embodiments, the cathode sheet is dried to remove solvent for 15 minutes to 3 hours at 30° C. to 150° C. In certain embodiments, the cathode sheet is dried to remove solvent for 1 hour±15 minutes at 120° C.±30° C. Different drying times may be used depending on the ramp-up time of the oven. In certain embodiments, a microwave oven or other oven with a similarly fast ramp-up time may be used, which would lower the baking time required. Also, drying times depend on the temperature used. Higher temperatures require shorter drying times, and lower temperatures require longer drying times. The cathode sheet should be baked at step 340 until all or substantially all (only a residual amount (ppm) is left) solvent is removed. In certain embodiments, the cathode sheet may be weighed after baking step 340 to determine whether substantially all solvent has been removed from the cathode sheet. The sheets 154 may be cut into the coupons 160 shown in FIG. 1B at step 350 using a manual cutting tool. A hydraulic press having platens or fixtures may be provided at step 360 to press the coupons into cathodes having a thickness smaller (e.g., twice as small) than the coupon. The cathode may be applied to a current collector and further incorporated into a primary or secondary electrochemical cell, as is well known to those of ordinary skill in the art.

Multiple baking steps at different points in the process result in unexpectedly superior cathodes and batteries.

The cathode is also baked after it is pressed at step 370, and before it is processed into a battery at step 380, by a second baking step that may be involve temperatures and times different from the first baking step 340.

Without being limited to any theory as to how some embodiments work, it is also believed that pressing, even with lubricating solvent, introduces stress into the cathode, particularly in the PTFE component, and that such stress is undesirable in a finished battery. The second baking step, performed after pressing, anneals the cathode and relaxes such stress, resulting in superior cathode and battery performance. For example, such annealing may result in lower impedance.

The PTFE binder used in cathodes, e.g., SVO, CFx, and SVO/CFx hybrid cathodes, has an elasticity modulus that is thermally sensitive. Without being limited to any theory as to how some embodiments work, process steps disclosed in this document, e.g., FIGS. 1A, 2A, and 2B, allow the PTFE to stretch as much as possible through cathode lamination and then, first and second baking step 340 and 370 thermally set the binder so that it does not stretch and flow as easily during the discharge of the battery. The more structurally solid cathode promotes better electrical conductivity in the cathode thus resulting in quicker and more consistent charge times.

Without being limited to any theory as to how some embodiments work, it is also believed that time spent at temperatures in excess of 120° C. may result in an undesirable change in the structure of the binder, such that the integrity is compromised. While this phase change may be minimal for short times spent at temperatures not too much in excess of 120° C., it is preferred to avoid temperatures in excess of 120° C. during baking. But, the time needed to achieve a given amount of drying or annealing is desirably shorter at higher temperatures. So, it is preferred to bake at temperatures close to or at 120° C., in order to increase process efficiency by reducing the time needed to achieve a desired amount of drying or annealing.

In the process with two baking steps, for the first baking step 340 (baking the sheet or "sheet dry"), baking may be performed at for 15 minutes to 6 hours at temperatures of 30° C. to 120° C.±30° C. As can be seen from the experimental results described in FIG. 4, the best results in terms of low acceptance pulse time are achieved at 120° C. at 1 hour of sheet dry. Longer times at lower temperatures are expected to achieve the same level of drying and the same result. More drying at this point, whether due to longer times or higher temperatures, may result in too much drying such that there is no residual solvent present during pressing. Less drying at this point may result in too much solvent being present during pressing, which may have undesirable effects. Baking may be performed for 15 minutes, 1 hour, 2 hours, 3 hours, 4 hours, 5 hours, 6 hours, or any range defined by any two of these times. Baking may be performed at temperatures of 30° C., 60° C., 90° C., 110° C., 120° C., or any range defined by any two of these temperatures. In certain embodiments, the first baking step 340 is performed for 15 minutes to 3 hours at 90° C. to 120° C.±5° C. In certain embodiments, the first baking step 340 is performed for 1 to 2 hours at 110° C. to 120° C.±5° C.

In the process with two baking steps, for the second baking step 370 (baking the pressed coupons or "press dry"), baking may be performed for 3 hours to 48 hours at temperatures of 30° C. to 120° C. Longer times at lower temperatures are expected to achieve the same level of drying and the same result. As can be seen from the experimental results described in FIG. 4, better results (lower pulse acceptance times) are achieved at longer dry times. But, most of the improvement due to baking at this step can, at 120° C., be attributed to the first three hours of baking post ramp-up time (once an equilibrium temperature of about 120° C. has been reached). While additional baking may result in additional improvement, the marginal improvement may not be worth the additional drying time, which reduces process efficiency and drives up costs. It is believed that most of the beneficial effects from annealing occur during the first three hours of baking after ramp-up. Additional improvement after 3 hours of baking once an equilibrium temperature of 120° C. has been achieved may be due to small amounts of additional annealing, or continuing removal of whatever small amount of solvent may remain. Baking may be performed for 1 hour, 3 hours, 6 hours, 9 hours, 12 hours, 15 hours, 18 hours, 21 hours, 24 hours or any range defined by any two of these times. Baking may be performed at temperatures of 30° C., 60° C., 90° C., 110° C., 120° C., or any range defined by any two of these temperatures. In certain embodiments, baking for 3-12 hours at 90° C.-120° C. is used at baking step 370. In certain embodiments, baking for 3-9 hours at 110° C.-120° C. is used at baking step 370. Baking may be performed for longer times, for example 4 days or longer.

As illustrated by the following examples, baking a cathode first after calender sheeting, and before cutting, and second after pressing, and before processing into a battery, leads to results unexpectedly superior when compared to baking only once.

EXAMPLES

Objects and advantages of this disclosure are further illustrated by the following examples. The particular materials and amounts thereof recited in these examples, as well as other conditions and details, should not be construed to unduly limit this disclosure.

Cathodes were subjected to a variety of different baking steps during processing, and the resultant batteries were characterized to see the effect of such baking. All baking in the examples was at 120° C.

The following examples describe the manner and process of manufacturing an electrochemical cell according to the present invention, and they set forth the best mode contemplated by the inventors for carrying out the invention, but they are not to be construed as limiting. Multiple batteries were built with cathodes fabricated using the process according to the comparative example, and from the process having two baking steps.

Comparative Example—One Baking Step (0 Press Dry, X Sheet Dry)

Silver vanadium oxide (SVO), graphite, carbon black, and polytetrafluoroethylene (PTFE) powder were weighed out and placed in a beaker. The proportions were as follows: 94% SVO, 1% graphite, 2% carbon black, and 3% PTFE by-weight. Weights were 188 g SVO, 2 g graphite, 4 g carbon black, and 6 g PTFE, ±0.005 g. 240 g±0.005 g Isopar® G was added to the dry ingredients, to arrive at approximately a 1.2 liquid to 1.0 solid weight ratio. The dry ingredients were combined with the Isopar® G using a plastic stirrer by slowly stirring. The ingredients were then mixed using a Dynamic MX070 MiniPro Mixer, slowly increasing the speed and run five minutes±30 seconds at maximum speed to form a thick paste.

The paste was then placed on to 9.0 cm Fisher Scientific® P2 Grade filter paper in a Büchner funnel. A vacuum was applied to the funnel and the paste was vacuumed until slight cracks formed on the surface to form a cake.

Approximately one half of the cake was then placed in a 2⅝ inch×15 inch poly bag. The remaining portion of the cake was placed in another poly bag. The poly bag was held up gently and shaken until the material was in the bottom one third of the bag. The bag was then laid flat on a work surface and the cake material was manually flattened into the bottom five inches of the poly bag. A scoopula was used to ensure that there were no voids or air pockets between the material and the bag.

The closed end of the bag was then gently inserted between 1.5 inch diameter rollers of an Imperia RM220 electric pasta machine, available from Emiolmiti®, using setting #6 (having a nip gap of 0.08 inch) and calendered (tube calendering step). The bag was then opened up and the bag was shaken to knock the material down to the bottom third of the bag (shaking step). The tube calendering step (using the same machine setting) and shaking step were repeated two additional times. The bag was then marked off at three inch intervals from the bottom of the bag up and cut at the demarcations. The bag was cut off and removed from the material.

Each section of material ("sample") was run through the 1.5 inch diameter calender rolls of the Imperia RM220 electric pasta machine at setting #3 (using a 0.04 inch calender nip) in the transverse direction (TD), resulting in the samples having a thickness of about 0.04 inch. As each section of the roll came out in the machine direction (MD), the samples were rotated 90° for the next step. The samples were then run through calender rollers using setting #2 of the machine (having a nip gap of 0.02 inch) in the TD to obtain briquettes having a thickness of about 0.02 inch. The samples were then folded in half for the next step to obtain briquettes having a thickness of about 0.04 inch. The samples were then run through the machine in the MD using setting #2 (having a nip gap of 0.02 inch), to obtain briquettes having a thickness of about 0.02 inch. The samples were then rotated 90° and run through the machine in the TD using a #1.3 setting (having a nip gap of 0.015 inch), resulting in briquettes having a thickness of about 0.015 inch.

The sheet blanks were then placed on an aluminum foil pan and placed into a Thermo Scientific™ Lindberg/Blue M™ Moldatherm™ Box Furnace. The vacuum oven was set at 120° C.±5° C., at less than 70 mmHg, and samples were baked (sheet dry) for 15 minutes (sample set 1), 1 hour (sample set 2), 6 hours (sample set 3), and 12 hours (sample set 4). The cathode electrode samples were then cut into coupons using a manual cutter and pressed into cathodes and incorporated into SVO/lithium batteries, as is well known to those of ordinary skill in the art.

Batteries are sensitive to moisture. Baking step one removes solvent and moisture from the cathode so it does not end up in the battery. The first baking step also geometrically stabilizes the sheet and sheet weight.

Examples—Two Baking Steps

Except for the baking steps, all materials and process parameters were the same as those described for the comparative example.

6 Press Dry, X Sheet Dry

After calendering, the vacuum oven was set at 120° C.±5° C., at less than 70 mmHg, and samples were baked (sheet dry) for 15 minutes (sample set 5), 1 hour (sample set 6), 6 hours (sample 7set), and 12 hours (sample set 8). After the cathode electrodes were cut into coupons and pressed into cathodes, sample sets 5-8 were baked at 120° C.±5° C. under vacuum, for 6 hours (press dry).

1 Press Dry, X Sheet Dry

After calendering, the vacuum oven was set at 120° C.±5° C., at less than 70 mmHg, and three samples were baked (sheet dry) for 3 hours (sample set 9), 6 hours (sample set 10), and 12 hours (sample set 11). After the cathode electrodes were cut into coupons and pressed into cathodes, sample sets 9-11 were baked at 120° C. under vacuum, for 1 hour (press dry).

Figure 4:
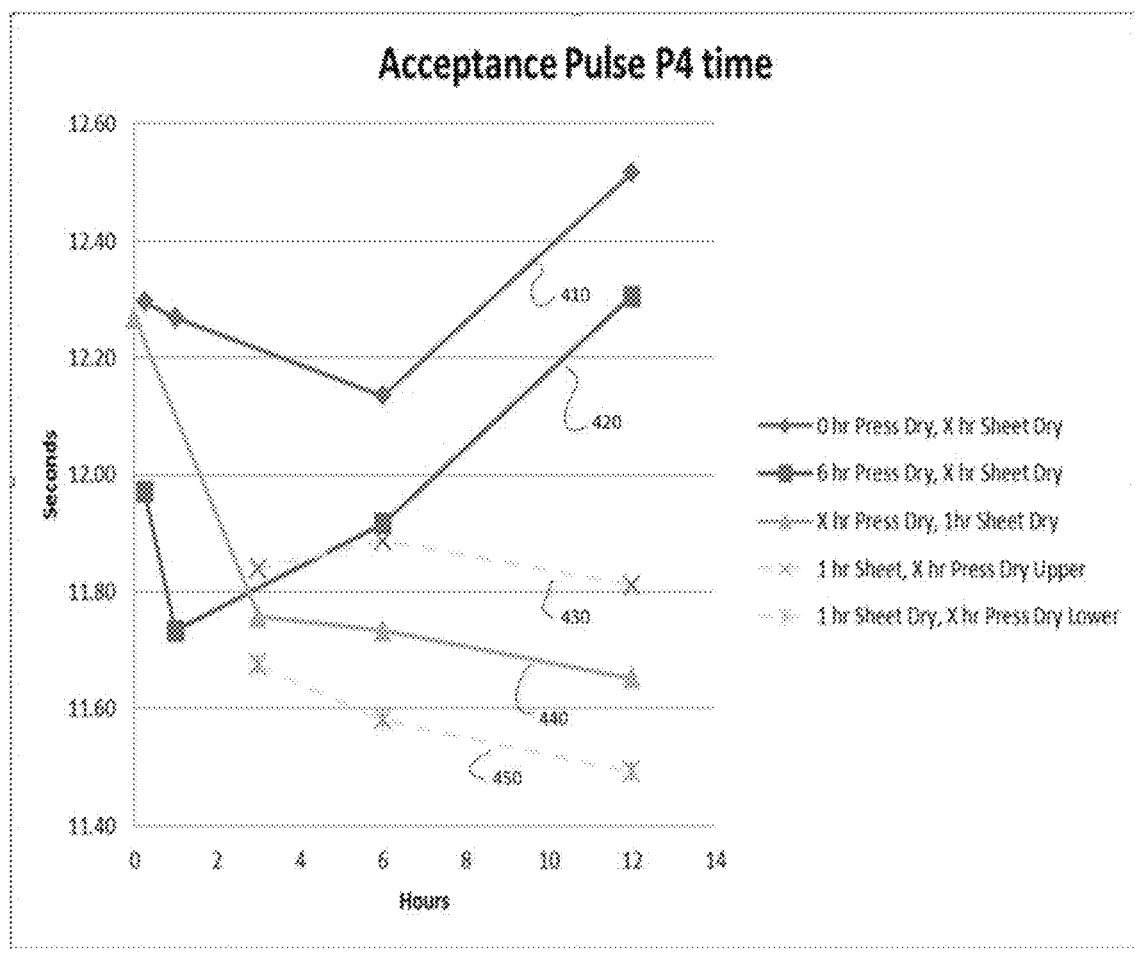
FIG. 4 shows plots of acceptance pulse times for batteries fabricated using cathodes subjected to a variety of different drying schedules during fabrication.

All samples were incorporated into a SVO/lithium battery and subject to an acceptance test. Four 40 mA/cm$^2$ pulses were applied to the batteries. After the fourth pulse the seconds required to reach 85 J (Y axis) was plotted as a function of baking time (X axis) for each sample set, as depicted in FIG. 4. FIG. 4 illustrates how the acceptance pulse time is affected by the baking steps. For the data shown in FIG. 4, all baking was performed at 120° C.±5° C. Plot 410 shows results for sample sets 1-4, described above (0 press dry and various times for sheet dry). Plot 420 shows results for sample sets 5-8 (6 hours press dry and various times for sheet dry). Plot 440 shows the mean results for sample sets 9-11 (various times for press dry and 1 hour sheet dry). Plot 430 shows the upper range (having the longest charge time) results for sample sets 9-11 and plot 450 shows the lower range (having the shortest charge range) results for sample sets 9-11.

The resulting test data depicts that if sheet dry only (plot 410) is used as described in the comparative example, the amount of time required to reach 85 J is approximately 12.2 seconds, with a 6 hour sheet dry time performing slightly better than a shorter or longer dry time. The best results were observed in plot 440, where the time required to reach 85 J is approximately 11.7 seconds, and press dry time does not create much variation in the battery performance indicating a more stable process. Plot 420 shows that the optimum sheet dry time at 120° C. is 1 hr when combined with a 3-12 hour pressed cathode dry step. Longer or shorter sheet dry times may adversely impact acceptance pulse performance.

An accelerated life test was also performed on the batteries to determine if the cathode processing steps affected the battery performance on a longer time scale. Five samples were tested. Sample 1 was baked at 120° C. for 1 hour at the initial baking step (sheet) and for 6 hours at the second baking step (press). Samples 2 and 3 were baked at 120° C. for 12 hour only at the initial baking step (sheet). Samples 4 and 5 were baked at 120° C. for 15 minutes only at the initial baking step (sheet). The samples were then formed into batteries. The batteries were held for 3 month at 72° C. under a background load of 3.6 K Ohm. Once a week the batteries were exposed to two pulses to extract 85 J while maintaining a minimum voltage of 1.6 volts at 37° C. The time required for the second pulse to extract 85 J is illustrated in FIG. 5.

Figure 5:
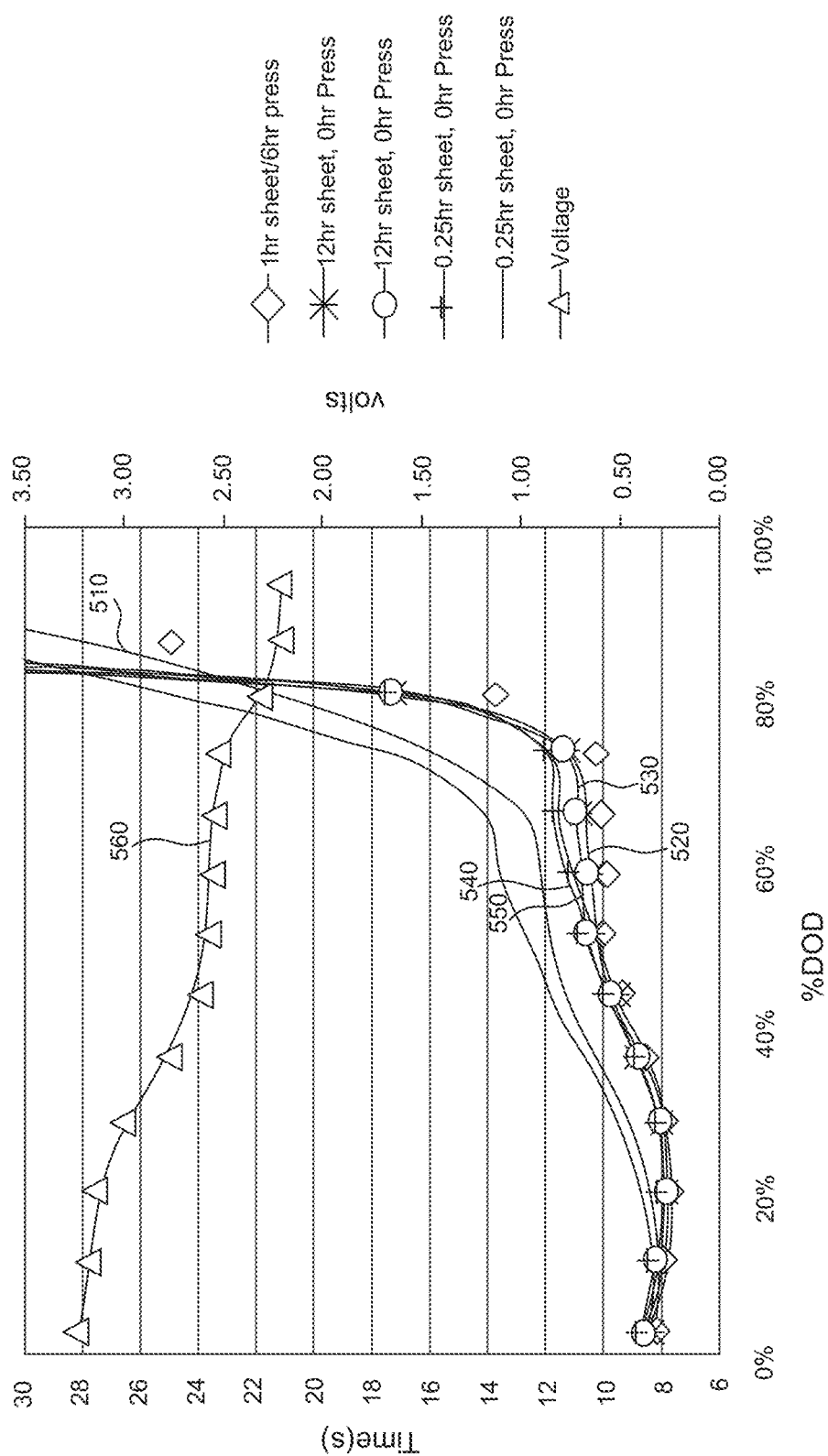
FIG. 5 shows plots of time and voltage vs. depth of discharge (% DOD) resulting from accelerated lifetime testing of batteries fabricated using cathodes subjected to a variety of different drying schedules during fabrication.

FIG. 5 shows the results of this testing, as plots of charge time vs. depth of discharge (% DOD) resulting from accelerated lifetime testing of the batteries. Plot 510 shows results for 1 hour sheet dry and 6 hours press dry (sample 1). Plot 520 shows results for 12 hour sheet dry and 0 hours press dry (sample 2). Plot 530 shows results for a different sample with 12 hours sheet dry and 0 hours press dry (sample 3). Plot 540 shows results for 0.25 hours sheet dry and 0 hours press dry (sample 4). Plot 540 shows results for a different sample with 0.25 hours sheet dry and 0 hours press dry (sample 5). Plot 560 shows voltage of the five samples as a function of depth of discharge.

The results of FIG. 5 illustrate that cathodes dried after being pressed have slightly better performance initially and significantly better performance after mid-life. The increase in charge time performance allows more capacity to be removed from the battery and still maintain acceptable charge times. This results in a medical device with more longevity even though the battery is the same volume and capacity.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

While some embodiments herein may be described with respect to lithium-SVO batteries, the description of those embodiments may be applicable to other types of batteries that use SVO cathodes, or batteries having other types of cathodes. For example and without limitation, CFx or SVO/CFx hybrids may be used as the active ingredient in the cathodes of a lithium battery in accordance with the current disclosure.

What is claimed is:

1. A method, comprising:
   mixing a solvent with a dry cathode mixture to form a slurry, the dry cathode mixture including a cathode active material, a conductive diluent, and a polymeric binder;
   at least partially removing the solvent from the slurry to form a composition;
   calendering, in a first calendering step, the composition to form a sheet having a first set of dimensions, calendering the composition including passing the composition between calender rollers;
   baking the sheet at a temperature of 25° C. to 150° C. for at least 15 minutes to form a dry sheet;
   cutting the dry sheet into coupons having a second set of dimensions different from the first set of dimensions;
   calendering, in a second calendering step, the coupons to form pressed coupons having a third set of dimensions different from the second set of dimensions;
   baking the pressed coupons to form cathodes by subjecting the pressed coupons to a temperature of 25° C. to 150° C. for at least one hour.

2. The method of claim 1, wherein baking the sheet includes subjecting the sheet to a temperature of 25° C. to 150° C. for 15 minutes to 3 hours±15 minutes.

3. The method of claim 2, wherein baking the sheet includes subjecting the sheet to a temperature of 80° C. to 150° C. for 1 hour to 2 hours.

4. The method of claim 3, wherein baking the pressed coupons includes subjecting the pressed coupons to a temperature of 60° C. to 150° C. for 3-12 hours.

5. The method of claim 3, wherein baking the pressed coupons includes subjecting the pressed coupons to a temperature of 80° C. to 150° C. for 3-9 hours.

6. The method of claim 3, wherein:
   the cathode active material comprises silver vanadium oxide;
   the conductive diluent comprises graphite and carbon black;
   the polymeric binder comprises polytetrafluoroethylene.

7. The method of claim 3, wherein, during mixing a solvent with the dry cathode mixture to form a slurry, the amount of solvent mixed with the dry cathode mixture is 55 to 75 wt % of the total weight of the slurry.

8. The method of claim 3, wherein the slurry has a first solvent to powder weight ratio, and
   wherein at least partially removing the solvent from the slurry is performed such that after the solvent removal, solvent to powder weight ratio is reduced to 15 wt % to 25 wt % of the first solvent to powder weight ratio.

9. The method of claim 1, wherein:
   baking the sheet includes subjecting the sheet to a temperature of 60° C. to 150° C. for 15 minutes to 3 hours; and
   baking the pressed coupons includes subjecting the pressed coupons to a temperature of 60° C. to 150° C. for 3-12 hours.

10. The method of claim 1, wherein:
    baking the sheet includes subjecting the sheet to a temperature of 80° C. to 150° C. for 1 hour to 2 hours; and
    baking the pressed coupons includes subjecting the pressed coupon to a temperature of 80° C. to 150° C. for 3-9 hours.

11. The method of claim 1, wherein the slurry has a first solvent to powder weight ratio, wherein the first solvent to powder weight ratio is a 1.2 liquid to 1.0 solid weight ratio and wherein the solvent is a liquid paraffin.

12. The method of claim 1, wherein calendering the composition to form the sheet comprises feeding the composition into a plastic tube and calendering the plastic tube using a calender machine comprising the calender rollers, wherein the diameter of the calender rollers is 4 inches or smaller, calendering the plastic tube including passing the plastic tube between the calender rollers.

13. The method of claim 1, wherein calendering the composition to form a sheet comprises feeding the composition into a plastic tube and calendering the plastic tube using a calender machine that includes calender rollers with a diameter of 1.5 inches.

14. The method of claim 1, wherein:
    the solvent includes a liquid paraffin;
    mixing the solvent with the dry cathode mixture includes adding to the dry cathode mixture the liquid paraffin so as to form an electrode active mixture having a 1.2 liquid to 1.0 solid weight ratio; and
    mixing the electrode active mixture to disperse the binder;
    at least partially removing the solvent from the slurry to form the composition comprises reducing the solvent to powder weight ratio to form a paste, wherein the paste is substantially 22% solvent by weight; and
    calendering the composition to form the sheet comprises:
    feeding the paste into a plastic tube; and
    calendering the plastic tube with the paste inside the tube so as to form a calendered paste.

15. The method of claim 14, wherein calendering the plastic tube comprises calendering the plastic tube using calender rollers that are between 1 inch and 3 inches in diameter.

16. The method of claim 14, wherein calendering the composition to form the sheet further comprises:
    calendering the plastic tube a plurality of more times;
    removing the plastic tube from the paste to form the sheet;
    calendering the sheet;
    cutting the sheet into a first sheet and a second sheet; and
    stacking the first sheet and the second sheet to form a stacked sheet.

17. The method of claim 16, wherein calendering the composition to form a sheet further comprises calendering the stacked sheet in a direction that is different from a direction in which the sheet was calendered.

18. The method of claim 14, wherein calendering the composition to form the sheet further comprises:
    removing the calendered paste from the plastic tube; and
    calendering the calendered paste so as to form the sheet with a thickness of 0.04 to 0.012 inches.

* * * * *